United States Patent
Anderson et al.

(10) Patent No.: US 9,710,780 B2
(45) Date of Patent: Jul. 18, 2017

(54) SYSTEM AND METHOD OF COORDINATING DISTRIBUTION OF AN ITEM

(71) Applicant: United States Postal Service, Washington, DC (US)

(72) Inventors: Mary P. Anderson, Washington, DC (US); James D. Wilson, Memphis, TN (US); Angela D. Lawson, Memphis, TN (US); Rosemarie Bolha, Wilkes-Barre, PA (US)

(73) Assignee: United States Postal Service, Washington, DC (US)

( * ) Notice: Subject to any disclaimer, the term of this patent is extended or adjusted under 35 U.S.C. 154(b) by 75 days.

(21) Appl. No.: 14/108,680

(22) Filed: Dec. 17, 2013

(65) Prior Publication Data
US 2014/0172739 A1    Jun. 19, 2014

Related U.S. Application Data

(60) Provisional application No. 61/738,085, filed on Dec. 17, 2012.

(51) Int. Cl.
*G06Q 10/00* (2012.01)
*G06Q 10/08* (2012.01)

(52) U.S. Cl.
CPC ... *G06Q 10/08355* (2013.01); *G06Q 10/0836* (2013.01)

(58) Field of Classification Search
CPC ............ G06Q 10/08355; G06Q 10/0836
See application file for complete search history.

(56) References Cited

U.S. PATENT DOCUMENTS

| | | | |
|---|---|---|---|
| 5,880,958 A * | 3/1999 | Helms et al. | 701/117 |
| 2002/0010661 A1 * | 1/2002 | Waddington et al. | 705/28 |
| 2002/0099567 A1 * | 7/2002 | Joao | 705/1 |
| 2003/0114206 A1 * | 6/2003 | Timothy et al. | 455/575 |
| 2004/0004119 A1 * | 1/2004 | Baldassari et al. | 235/384 |
| 2004/0030572 A1 * | 2/2004 | Campbell et al. | 705/1 |
| 2004/0068443 A1 * | 4/2004 | Hopson et al. | 705/26 |
| 2005/0049942 A1 * | 3/2005 | Richard et al. | 705/28 |

(Continued)

FOREIGN PATENT DOCUMENTS

JP    2008-037560    2/2008

OTHER PUBLICATIONS

Crevier et al., "The multi-depot vehicle routing problem with inter-depot routes," European Journal of Operational Research 176 (2007) 756-773.*

(Continued)

*Primary Examiner* — Kevin Flynn
*Assistant Examiner* — Scott Tungate
(74) *Attorney, Agent, or Firm* — Knobbe Martens Olson & Bear LLP

(57) ABSTRACT

A system and method for coordinating item delivery is disclosed. The system includes a control hub configured to receive item information, a dynamic routing system configured to provide routing instructions, and a handheld device configured to receive routing instructions. The control hub controls and coordinates receiving and transmitting item information, including pick-up and delivery schedules, and other item information.

21 Claims, 4 Drawing Sheets

(56) References Cited

U.S. PATENT DOCUMENTS

| | | | | |
|---|---|---|---|---|
| 2006/0111955 | A1* | 5/2006 | Winter | G06Q 10/06 705/7.19 |
| 2006/0235739 | A1* | 10/2006 | Levis et al. | 705/9 |
| 2007/0000989 | A1 | 1/2007 | Kadaba | |
| 2007/0103342 | A1* | 5/2007 | Milleville | G08G 1/202 340/988 |
| 2008/0040133 | A1 | 2/2008 | Foth et al. | |
| 2010/0324959 | A1* | 12/2010 | Templeton | G06Q 10/08 705/334 |
| 2012/0246039 | A1 | 9/2012 | Fain et al. | |

OTHER PUBLICATIONS

Li et al., "Real-time vehicle rerouting problems with time windows," European Journal of Operational Research 194 (2009) 711-727.*

International Search Report and Written Opinion dated Jun. 27, 2014 for International Application No. PCT/US2013/075155, filed Dec. 13, 2013, which shares priority of U.S. Appl. No. 61/738,085, filed Dec. 17, 2012 with captioned U.S. Appl. No. 14/108,680.

Kiyoshima, "Strategy Research Sagawa Express: Rapid Progress with IT Investment of 10 billion yen per a year Increase Dealings of Home Delivery Service to catch up with Yamato", the January issue of Nikkei Information Strategy, Dec. 24, 2003, No. 141, pp. 102-106, Nikkei BP Company.

* cited by examiner

SYSTEM AND METHOD OF COORDINATING DISTRIBUTION OF AN ITEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of U.S. Provisional Application 61/738,085, filed Dec. 17, 2012, the entire contents of which are hereby incorporated by reference.

BACKGROUND OF THE INVENTION

Field

This disclosure relates to a system and method of receiving and coordinating delivery of an item or a plurality of items.

SUMMARY

Some embodiments disclosed herein relate to a system for distributing a plurality of items to a plurality of destinations comprising a control hub configured to receive item information for each of the plurality of items and to generate a unique identifier for each of the plurality of items, the unique identifier associated with the received item information for the corresponding item of the plurality of items; a dynamic routing system in communication with the control hub, wherein the control hub is configured to provide at least part of the item information to the dynamic routing system and to receive routing instructions from the dynamic routing system; a sorter in communication with the control hub, the sorter being configured to sort the plurality of items according to the item information and the routing instructions; a device in wireless communication with the control hub, wherein the control hub wirelessly communicates routing instructions to the device; and a user interface in communication with the control hub, the user interface configured to send information and queries to and receive information and queries from the control hub, the information and queries related to delivery, a pick-up, and tracking of a delivery status of one of the plurality of items, wherein the control hub is configured to associate information and queries received from the device with the stored item information for the corresponding item of the plurality of items.

In some embodiments, the system further comprises a payment system in communication with the control hub, the payment system configured to provide payment information regarding at least one of the plurality of items.

In some embodiments, the item information comprises at least one of pick-up location, delivery location, vendor name, recipient name, item dimensions, and delivery instructions.

In some embodiments, upon receiving item information for the plurality of items, the dynamic routing system is configured to generate routing instructions for each of the plurality of items and is configured to assign each of the plurality of items a route sequence number.

In some embodiments, the routing instructions provide an route optimized to minimize the time required by the route for the pick-up and delivery of each of the plurality of items.

In some embodiments, the control hub is configured to receive the routing instructions and the route sequence number for each of the plurality of items, and wherein the control hub associates the item information of each of the plurality of items with the routing instructions and route sequence number for each corresponding item of the plurality of items.

In some embodiments, the control hub is further configured to associate the routing instructions and the route sequence number for each of the plurality of items with the unique identifier for the corresponding item of the plurality of items.

In some embodiments, the sorter is configured to receive the associated item information, routing instructions, and route sequence number from the control hub, and is configured to sort each of the plurality of items according to the received associated item information, routing instructions, and route sequence number.

In some embodiments, the control hub is configured to receive payment information from the payment system, and is configured to associate a payment status with each of the plurality of items.

In some embodiments, the user interface is accessible via a network remote from the control hub.

In some embodiments, the control hub is configured to query the handheld device regarding the delivery status of one of the plurality of items and is further configured to provide the query results to the user interface.

In some embodiments, the delivery status comprises at least one of pick-up confirmation, delivery confirmation, or item location.

In some embodiments, the routing instructions received from the control hub comprise a pick-up schedule, a delivery schedule, pick-up route, and delivery route, for at least one of the plurality of items and wherein the handheld device is configured to provide directions for the pick-up route and delivery route using a global positioning system In some embodiments, the control hub is configured to associate the item information, routing instructions, and route sequence number to the sorter and the handheld device such that each of the plurality of items is scheduled for pick-up and delivery on the same day.

Some embodiments described herein relate to a method of delivering a plurality of items to a plurality of destinations comprising receiving, via a control hub, item information for each of the plurality of items; storing the item information for each of the plurality of items in a database accessible by the control hub; generating a unique identifier for each of the plurality of items, the unique identifier being associated with the stored item information for each corresponding item of the plurality of items; providing at least a portion of the stored item information for at least one of the plurality of items to a dynamic routing system; generating routing instructions in the dynamic routing system, the routing instructions comprising optimal pick-up and delivery routes for at least one of the plurality of items; sorting the plurality of items according to the associated item information; receiving the routing instructions in the control hub and wirelessly communicating the routing instructions to a plurality of handheld devices, wherein the handheld devices display route information for each of the plurality of items; receiving pick-up and delivery confirmations for at least some of the plurality of items from the handheld device; providing pick-up and delivery status information for at least one of the plurality of items from the handheld device to a user interface; associating the pick-up and delivery status information for at least some of the plurality of items with the item information stored in the database; and providing real-time pick-up and delivery information for at least one of the plurality of items to the control hub.

In some embodiments, the item information comprises at least one of pick-up location, delivery location, vendor name, recipient name, item dimension, or delivery instructions.

In some embodiments, the method further comprises assigning a route sequence number to each of the plurality of items.

In some embodiments, the control hub receives the routing instructions and the route sequence number from the dynamic routing system, and associates the item information of each of the plurality of items with the routing instructions and the route sequence number for each corresponding item of the plurality of items.

In some embodiments, the method further comprises associating the routing instructions and the route sequence number for each of the plurality of items with the unique identifier for each corresponding item of the plurality of items in the control hub.

In some embodiments, the method further comprises receiving a payment status for each of the plurality of items and associating the payment status with each of the plurality of items.

In some embodiments, the user interface is accessible remote from the control hub.

In some embodiments, receiving pick-up and delivery status from the handheld device comprises querying the handheld device in response to an input received via the user interface, and providing the pick-up and delivery status from the handheld device to the user interface via the control hub in response to the query.

In some embodiments, the handheld device provides directions for the optimal pick-up route and delivery route for each of the plurality of items, using a global positioning system.

In some embodiments, associating the item information of each of the plurality of items with the routing instructions and the route sequence number for each corresponding item of the plurality of items comprises generating pick-up and delivery schedules such that each of the plurality of items is picked up and delivered on the same day; and transmitting the pick-up and delivery schedules to the plurality of handheld devices.

In some embodiments, the item information received via the control hub comprises a time restriction on pick up or delivery.

In some embodiments, the method further comprises evaluating whether available resources are sufficient to meet the time restrictions on pick up or delivery; requesting additional resources if available resources are insufficient; receiving additional resources; and revising the routing instructions according to the additional resources.

Some embodiments described herein relate to a method of routing delivery resources comprising requesting agent identification information, wherein the agent identification information identifies a particular agent; receiving the agent identification; transmitting the agent identification information to a control hub; receiving a route identification number from the control hub; receiving route information associated with the route identification number, wherein the route information comprises item information for two or more items; displaying navigation information for a first item of the two or more items; receiving confirmation of item disposition; transmitting confirmation of item disposition to the control hub; and displaying navigation information for a second item of the two or more items.

In some embodiments, the item information comprises a pick up address.

In some embodiments, the item information comprises a delivery address.

In some embodiments, the item disposition comprises confirmation of item pick up or delivery.

In some embodiments, receiving confirmation of item disposition comprises receiving a scan of a barcode.

Some embodiments described herein relate to a system for coordinating distribution of one or more items comprising means for receiving, via a control hub, item information for each of the plurality of items; means for storing the item information for each of the plurality of items in a database accessible by the control hub; means for generating a unique identifier for each of the plurality of items, the unique identifier being associated with the stored item information for each corresponding item of the plurality of items; means for providing at least a portion of the stored item information for at least one of the plurality of items to a dynamic routing system; means for generating routing instructions in the dynamic routing system, the routing instructions comprising optimal pick-up and delivery routes for at least one of the plurality of items; means for sorting the plurality of items according to the associated item information; means for receiving the routing instructions in the control hub and wirelessly communicating the routing instructions to a plurality of handheld devices, wherein the handheld devices display route information for each of the plurality of items; means for receiving pick-up and delivery confirmations for at least some of the plurality of items from the handheld device; means for providing pick-up and delivery status information for at least one of the plurality of items from the handheld device to a user interface; means for associating the pick-up and delivery status information for at least some of the plurality of items with the item information stored in the database; and means for providing real-time pick-up and delivery information for at least one of the plurality of items to the control hub.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

Figure 1:
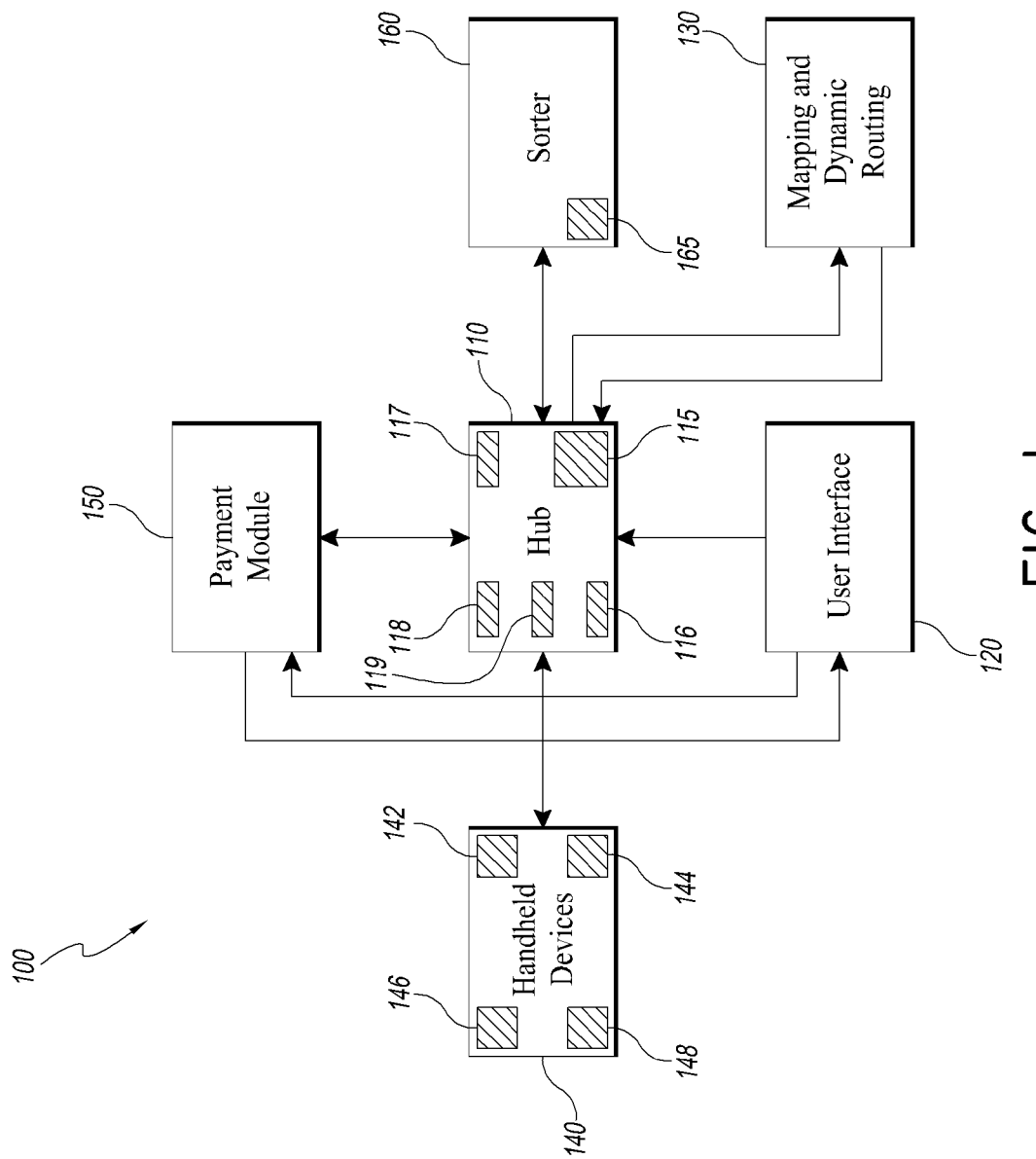
FIG. 1 is a block diagram depicting an embodiment of a system for coordinating pick-up and delivery of items.

Various features illustrated in the drawings may not be drawn to scale. Accordingly, the dimensions of the various features may be arbitrarily expanded or reduced for clarity. In addition, some of the drawings may not depict all of the components of a given system, method or device. Finally,

DETAILED DESCRIPTION

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The system and method described herein relate to coordinating pick-up of items from a variety of sources, including vendors, merchants, and other retailers, including online retailers. The system and method described herein also relate to coordinating the delivery of the picked up items within a specific geographical area, such as a metropolitan area, a city, or a neighborhood. In some embodiments, the system of pick-up and delivery is related to pick-up and delivery of items within a specified or pre-determined time, such as pick-up and delivery on the same day, next-day delivery, or other specified time period.

In some embodiments, the system and method of coordinating pick-up and delivery provides a convenient way to order items and have them delivered within a specified time frame. For example, a user may live in a metropolitan area, and may not have easy access to an automobile. The user may want to purchase an item from a vendor, merchant, or retailer, but may not want or be able to transport the item on public transportation or may not want or be able to carry the item home. The system and method described herein provide a way for such a user to purchase items and have them delivered to the user's home. For example, a user may be physically present at a store or other merchant or retailer, and purchase an item which the user cannot, or does not wish to transport him or herself. The user may request pick-up and delivery using the system and method described herein. The user may then expect delivery of the item to the user's home within a specified time period, such as within the same day as the purchase. In some embodiments, the system and method described herein comprise providing an on-line purchasing system wherein users who purchase an item online can request delivery, using the system and method of the present application, within a specified time period, such as within the same day.

In some embodiments, the system and method described herein may comprise a merchant, retailer, vendor, or other commercial party which orders an item and wishes the item to be delivered to another commercial location or party within the same day or other specified time period.

As used herein, unless otherwise indicated, resource may refer to a carrier, a vehicle, or other persons or objects capable of picking up, containing, and/or delivering items, such as postal carriers and postal vehicles.

In some embodiments, the system and method described herein provides real-time tracking of an item and the item's pick-up and delivery status throughout the pick-up and delivery cycle, via a user interface. In some embodiments, the system and method described herein provide faster delivery by optimizing routes to maximize pick-up and delivery efficiency, while reducing pick-up and delivery time and costs.

FIG. 1 depicts an embodiment of a system 100 for coordinating pick-up and delivery of items. The system 100 comprises a control hub 110, a user interface 120, a dynamic router 130, a hand held device 140, a payment module 150, and a sorter 160. The control hub 110 is in communication, either wired or wirelessly, with at least the user interface 120, the dynamic router 130, the hand held device 140, the payment module 150, and the sorter 160.

The control hub 110 may comprise or be a component of a processing system implemented with one or more processors. The control hub 110 may be a network of interconnected processors housed on one or more terminals. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The control hub may comprise a processor 118 such as, for example, a microprocessor, such as a Pentium® processor, a Pentium® Pro processor, a 8051 processor, a MIPS® processor, a Power PC® processor, an Alpha® processor, a microcontroller, or the like. The processor 118 typically has conventional address lines, conventional data lines, and one or more conventional control lines. The processor 118 may be in communication with a memory 119, which may include, for example, RAM memory, flash memory, ROM memory, EPROM memory, EEPROM memory, registers, hard disk, a removable disk, a CD-ROM, or any other form of storage medium known in the art. The memory may include, for example, software, at least one software module, instructions, steps of an algorithm, or any other information. In some embodiments, the processor 118 performs processes in accordance with instruction stored in the memory 119. These processes may include, for example, controlling features and/or components of the system 100, and controlling access to and from, and transmitting information and data to and from the control hub 110 and the constituent components of the system 100, as will be described herein.

The hub 110 comprises a memory 115, configured to store item information, such as pick-up information, delivery information, user information, specific pick-up instructions, specific delivery instructions, and payment information. The memory 115 may comprise a database, a comma delimited file, a text file, or the like. The control hub 110 generates a unique identifier for each item upon receipt of any item information regarding the purchase of an item, which may include the information described above. The control hub 110 is configured to associate the item information stored in the memory 115 for each item, with the unique identifier for each item, and to store the association in the memory 115. The control hub 110 is configured to coordinate and direct the activities of the components of system 100, and to coordinate providing user access to pick-up and delivery information for an item being picked-up or delivered via the system 100.

In some embodiments, the processor 118 is connected to a communication feature 117. The communication feature 117 is configured for wired, and/or wireless communication. In some embodiments, the communication feature 117 communicates via telephone, cable, fiber-optic, or any other wired communication network. In some embodiments, the communication feature 117 may communicate via cellular networks, WLAN networks, or any other wireless network. The communication feature 117 is configured to receive instructions and to transmit and receive information among components of the system 100, and in some embodiments, with a central server (not shown) or other resource outside system 100, as desired.

In some embodiments, the control hub is in communication with the user interface 120. The user interface 120 is configured to provide user access to the pick-up and delivery system. The user interface 120 may be provided over a website or internet portal accessible from an internet-enabled computer or mobile computing device. The user interface 120 can be provided as an application configured for use on a smart phone.

The user interface 120 provides a user with options to schedule a pick-up, view scheduled pick-ups, view scheduled deliveries, of any other desired functionality. The user interface 120 may be customizable for a particular user, such as a retailer. In some embodiments, using the user interface 120, a user may input an order into the system 100. The order may comprise the purchase of an item and scheduling a pick-up or designation of the item for delivery using the system 100. For example, a user may order an item at a store, a vendor, merchant or other retail location. At the location, a user, which may be the merchant, vendor, or retailer, or, in some embodiments, the purchaser, inputs the item information, including, for example, pick-up location, delivery location, and any specific pick-up or delivery instructions. The item information is then transmitted to the control hub 110. In some embodiments, the user interface at a particular location may require a log-in identity to access the system 100. This log-in identity may be transmitted to the control hub 110 and may automatically identify the pick-up location, without the need for user input of the pick-up location.

The user interface 120 may be configured to provide payment information to a payment module 150. This information may include whether a fee or payment, such as postage, for pick-up and/or delivery of the item has been paid. For example, in some embodiments, a user may pay for pick-up or delivery, by paying a fee or buying postage, at the time of purchase of the item, either in a store or retailer, or on-line. In some embodiments, a user may indicate that the fee or the postage, is payable upon delivery. In some embodiments, a user may indicate whether insurance on the item is desired, and may purchase insurance via the user interface 120.

The user interface 120 may comprise other capabilities, which will be described in greater detail below.

Upon receiving the item information from the user interface 120, the control hub 110 stores the item information in the memory 115. The control hub 110 also generates a unique identifier for the item. The unique identifier may be an alphanumeric string, a computer readable code such as, for example, a barcode, a 1-D barcode, a 2-D barcode, a QR-code, an RFID tag, or any other desired computer readable code, a biometric identification feature, a color pattern, and image, or any other visual identifier. The control hub 110 associates the item information stored in memory 115 with the unique identifier, and stores the association in the memory 115. In some embodiments, the association and/or the unique identifier may be stored in a database, or may be transmitted via wired or wireless communication to a central server (not shown) or may be transmitted to a cloud-based computer location.

The control hub 110 is in communication with the dynamic router 130. The dynamic router may comprise a processor, memory, databases, address and control lines, and other components similar to those described herein for the control hub 110. The control hub is configured to transmit at least a portion of the item information to the dynamic router 130. For example, the control hub 110 may transmit the pick-up location and the delivery location, along with any specific routing instructions, to the dynamic router 130. The control hub 110 need not transmit all of the item information, such as some specific delivery instructions, the purchase price of the item, etc., to the dynamic router. In some embodiments, the control hub 110 does not transmit the unique identifier to the dynamic router 130.

The control hub 110 may transmit item information to the dynamic router 130 in batches. For example, the control hub 110 may transmit a "pick-up batch," which comprises the pick-up location information for each of a plurality of items whose order or item information was received from the user interface 120 or is stored in the memory 115. The control hub 110 may also transmit a "delivery batch," which comprises the delivery location information for each of a plurality of items whose order or item information was received from the user interface 120 or is stored in the memory 115. In some embodiments, the control hub 110 is configured to transmit the "pick-up batch" at a certain time of the day, or before a certain time of the day, or upon reaching a predetermined number of items to be picked up. Similarly, in some embodiments, the control hub 110 is configured to transmit the "delivery batch" at a certain time of the day, at certain intervals, and/or upon reaching a predetermined number of items to be delivered. For example, the control hub 110 may be configured to transmit a pick-up batch every day at ten a.m., at noon, once every 2 hours, or at any other desired time or frequency. In some embodiments, for example, the control hub 110 is configured to submit a delivery batch every day at noon, at two p.m., or once every 2 hours, or at any other desired time or frequency. In some embodiments, the control hub 110 may be configured to submit the final delivery batch of the day by, for example, four p.m. In some embodiments, the control hub 110 may be configured to stop accepting orders or item information for a given delivery day at a specific time. For example, the control hub 110 may be configured to stop accepting item information for same-day deliver at two p.m., or at any other specified time. In some embodiments, the control hub 110 may transmit a batch containing both items for pick-up and delivery.

The dynamic router 130 is configured to receive the item information, pick-up batch, or delivery batch information from the control hub 110. The dynamic router 130 is configured to generate an optimized route for pick-up, delivery, or both of a plurality of items. The dynamic router 130 may use one of several known route optimization software models. In some embodiments, the dynamic router 130 is configured to optimize a pick-up or delivery route based on optimizing one or more variables, such as minimizing time and/or distance between item pick-ups or deliveries, overall distance traveled, reducing the number of left turns, or any other desired variable. The dynamic router 130 is further configured to generate routing instructions for each item, which have been optimized for one or more of the above variables, and group the individual items into one or more of the optimized routes. The dynamic router 130 is configured to generate a route identification number for each dynamically generated route, and associate each item with a route identification number.

In some embodiments, the dynamic router 130 is configured to generate a route sequence number. The route sequence number is assigned to each item which has been designated or grouped into a single route. The dynamic router 130 is configured to communicate the routing instructions, the route identification numbers, and the item sequence number to the control hub 110. In some embodiments, the dynamic router is configured to receive an input from the control hub 110 regarding the number of available resources. The resources may be or correlate to the number of delivery vehicles, the number of carriers, the capacity of the vehicles and/or carriers, or other desired quantities or qualities regarding the resources available to pick-up and/or deliver items. In some embodiments, the dynamic router 130 generates routing instructions for each route, which include the pick-up and/or delivery location of each item grouped into a specific route, turn-by-turn directions to each pick-up and/or delivery location.

In some embodiments, the dynamic routing system may be configured to receive an input from the control hub 110 regarding time requirements or item-specific restrictions on the delivery of certain items. In some embodiments, the dynamic router is configured to take into account the resource availability or limits, special timing or other instructions while grouping items into routes. In some embodiments, the dynamic router 130 is configured to provide a notification if any specific time or other specific instructions cannot be carried out or met based on the available resources. In some embodiments, the dynamic router 130 is configured to request additional resources from the control hub 110, if needed.

The dynamic router 130 is configured to transmit the routing instructions for each item and the route serial numbers for each route to the control hub 110. Upon receiving this information, the control hub receives the routing instructions and associates the routing instructions for each item and the route serial number of each item with the item information stored in the memory 115 and with the unique identifier, and stores the association as described elsewhere herein. In some embodiments, control hub 110 comprises a printer 116. Control hub 110 may be configured to print a label using printer 116, which may contain the unique identifier and delivery information for each item, the route serial number, and any other desired information. The label may contain the unique identifier in the form of a bar-code, RFID tag, QR code, or any other desired computer readable code. The label may be applied to each item upon pick-up, or may be applied upon receipt of the items at the sorter 160, which will be described in greater detail below.

In some embodiments, during or after purchasing an item, a customer, a vendor, retailer, merchant, or purchasing party may request and receive the unique identifier information for a particular item from the control hub 110 via the user interface 120. The customer, vendor, retailer, or merchant may print the unique identifier and affix it to the item to be picked-up. For example, when a customer purchases an item at a store, and elects, via the user interface 120, the pick-up and delivery of an item using system 100 the user interface 120 may prompt the customer, vendor, retailer, or merchant to select an option to print a label including a unique identifier. In this case, the user interface 120 requests the unique identifier and label information, such as delivery address and recipient from the item information stored in memory 115, and delivers a printable label to the customer, vendor, merchant, or retailer. Such a transaction may occur in a store, at a dedicated terminal, or it may occur at a customer's home, where the customer accesses the user interface 120 via the internet.

The control hub 110 stores the item information, the unique identifier, the associated route information, and the associated route serial number of each item, in anticipation of a request from the handheld device 140.

In some embodiments, the handheld device 140 is a portable electronic device comprising a display 142, an input device 144, a scanner 146, and a global positioning system (GPS) unit 148. The handheld device 140 is configured to wirelessly communicate with the control hub 110 via a cellular network, a wireless local area network (LAN), RF network, a near field network such as blue tooth, or a wireless protocol such as IEEE 802.11x. The handheld device 140 is configured to communicate with the control hub 110 via a docking port or other similar wired connection. The handheld device 140 can download route and/or item information while the handheld device 140 is docked with the docking port. In some embodiments, the handheld device 140 is a GPS enabled smartphone, tablet computer, personal digital assistant, or other similar portable communication device. The handheld device 140 contains a program or instructions which provide an interface with the control hub 110 which enables a resource or carrier to receive and send instructions and other information to and from the control hub 110.

In some embodiments, The display 142 is configured to display the address or location, including, if desired, longitude and latitude, where an item is to be picked up and/or delivered. In some embodiments, the display 142 is further configured to provide navigation instructions, such as turn-by-turn route instructions, to guide the resource to each pick-up or delivery location. The turn-by-turn route instructions may comprise the routing instructions generated by the dynamic router 130.

In some embodiments, the input device 144 may be one or more of a keypad, a keyboard, a touch-screen, a mouse, a stylus, or other similar input device. The input device 144 provides a way for a resource to log-in to the system 100, access routing instructions stored at the control hub 110, and to transmit any desired information. In some embodiments, inputting resource log-in information or item information may be accomplished using the scanner 146. For example, a resource may use the scanner 146 to scan an identification code contained on an ID card or badge. The scanner 146 receives the scanned code and the handheld device 140 is configured to transmit the identification information of the resource to the control hub 110. The scanned code identifies the resource to the control hub 110 and, if the scanned code is recognized, allows access to the system 100.

In some embodiments, the scanner 146 may be used to scan the unique identifier of each item, which may be located on the label provided by the control hub 110. In some embodiments, for example, the scanner 146 is configured to read the unique identifier on the label affixed to an item. The unique identifier may be encoded in a 1D or 2D barcode, a QR code, a RFID tag, an alphanumeric string, a visual or graphical identifier, or any other desired computer readable code, By scanning and reading the unique identifier, the handheld device 140 may transmit information regarding pick-up or delivery status to the control hub 110.

In some embodiments, the handheld device comprises the GPS unit 148. The GPS unit 148 may provide an input to the navigation instructions by identifying the location of the resource, and using the resource location as an input to provide turn-by-turn navigation to the pick-up and/or delivery locations. In some embodiments, the handheld device 140 is configured to transmit GPS position data of the resource to the control hub 110, which enables real-time tracking of the resource. The control hub 110 receives and stores the GPS coordinates. The control hub 110 may associate the GPS coordinates with a map to generate a map of the route the resource has taken, and to indicate the current position of the resource on the map.

The handheld device 140 may be configured to receive an input relating to a location or route, such as a route identification number assigned to a particular resource and to transmit the location or route identification number to the control hub 110. The control hub 110 can then identify which route generated by the dynamic router 130 is closest to or is assigned to the particular resource, and transmit the corresponding route information. The handheld device 140 is configured to receive the route information from the control hub 110, and display the route information to the resource. In some embodiments, the handheld device 140 may be configured to receive additional item specific information sent by the control hub 110, such as payment information, specific pickup or delivery instructions, such as where to leave a package, or other desired item specific information. In some embodiments, the handheld device 140 is configured to receive an input of a route identification number. The handheld device 140 can request the route instructions associated with the route identification number from the control hub 110 and/or the dynamic router 130.

In some embodiments, a user may inquire about the status of a pick-up or delivery, and request real-time information via the user interface 120. In some embodiments, the user interface 120 may comprise a network access point, such as, for example, a dedicated computer or terminal at a vendor, merchant, or retail location. In some embodiments, the user interface 120 may be accessible to a customer, merchant, retailer, vendor, or purchasing party via the internet using an internet enabled computer, or using a tablet computer, smartphone, using a specific application, or via any other wired or wireless means. In an exemplary embodiment, the user accesses the user interface 120 via an website over an internet connection. For example, the user interface 120 is configured to request and accept a user login. The user login may be established for a customer at the time of purchase, or the user may register with the system 100, and use the same login credentials for all of the user's purchases, pick-ups, and/or deliveries. The user login information may be stored at control hub 110, or may be stored in a memory, for example, in a database accessible by the control hub 110. When a user requests a login via the user interface 120, the user interface 120 is configured to query the control hub 110 to identify the user as a customer or registered user, and is configured to provide the user with options for tracking items associated with that user.

In some embodiments, the user may request to track the status of a particular item. The user interface 120 is configured to query the control hub 110 in response to user requests. The control hub 110 is configured to provide a response to the user request. If the user requests real time tracking information of a user's item or of the resource, the control hub 110 may query the handheld device 140 for up-to-date, real-time tracking information. The control hub 110 may access the stored GPS coordinates. The control hub 110 may then provide the location of the item or the resource. The control hub 110 may compare the route received from the dynamic router 130 and compare it to the location of the resource received from the handheld device 140. Based on this information, the control hub 110 can estimate the time of delivery of the user's item, and provide an estimated delivery time to the user.

For example, the user may request the pick-up or delivery status of an item. If the item has been picked up or delivered, the control hub 110 is configured to provide notice of the pick-up and/or delivery and the confirmation number associated with the pick-up and/or delivery. If the item has not been picked-up or delivered yet, the control hub 110 may query the handheld device 140 in use by the resource assigned to pick-up or deliver a specific item or group of items and request the location or coordinates of the handheld device 140, and thus, the location of the resource picking up or delivering the item(s). In response, the handheld device 140 may respond to the query, and provide the location or coordinates of the handheld device 140. The control hub 110, then communicates the location of the handheld device 140 and the resource to the user interface 120, which can display the location of the resource on a map for the user. The control hub 110 may not provide to a user the specific location of the resource due to privacy or safety concerns. In this instance, the control hub 110 can provide an approximate or generalized location, such as, "the resource is on your block," or "the resource is 0.8 miles from your location." The control hub 110 can also provide only an estimated time of delivery or pick-up without providing location information.

In some embodiments, the control hub 110 may provide the GPS location and the routing instructions of the user's item vis-à-vis the other items. For example, if the user's item has not yet been picked up, the control hub 110 may communicate to the user interface 120 that the user's item is, for example, the fourth item scheduled for pick-up and/or delivery, or that there are two remaining pick-ups or deliveries prior to the pick-up and/or delivery of the user's item. In some embodiments, the control hub 110 may provide an estimated time of delivery to the user interface 120, based on the GPS coordinates of the handheld device 140, and the routing instructions corresponding to the user's item. The user interface 120 may then display the location and a pick-up or delivery estimate to the user.

In some embodiments, the user may be an agent or other management or supervisory personnel. In these embodiments, the agent or supervisor logs in, and the system 100 is configured to authenticate the login identification as described above. More specifically, the agent or supervisor logs in to the user interface 120 and is presented with supervisory options according to the agent or supervisor's permissions and responsibilities. The user interface 120 for an agent or supervisor may be configured to provide access to the pick-up and/or delivery status and GPS location of all the resources assigned to a particular geographic area or area of responsibility. The agent or supervisory user interface 120 may also be configured to allow the agent or supervisor to communicate, via the control hub 110, with the individual resources to provide further instructions, to address problems, or for any other desired reason. This communication may be via e-mail, text messages, video, audio, or any other desired means. In some embodiments, the user interface 120 may be configured to provide the agent or supervisor with a graphical display pinpointing the location of all available resources on a map, and provide real-time movement information as the resources follow the routing instructions.

In some embodiments, the control hub 100 is configured automatically to monitor the movements and pick-up and delivery status of each item, and to provide automated communication to individual resources regarding changes in routing instructions, developing problems, such as traffic, road construction, etc., changes in pick-up and/or delivery schedules, cancellations, and for any other desired reason. These communications may be generated by the control hub 110 and relayed to the individual resources via the handheld devices 140 via the communication feature 117. The communication may be an email, SMS text, voice message, graphical alert on the handheld device 140, or any other desired communication method.

As depicted in FIG. 1, the control hub 110 is in communication with the payment module 150. In some embodiments, Upon receiving item information from the user interface 120, the control hub may query the payment module 150 to inquire, for each item whose item information the control hub receives, whether a fee, payment, such as postage, has been paid, or whether a fee is required. In some embodiments, the control hub 110 is configured to provide, to the dynamic router 130, the item information for only those items whose postage or fees have been paid, or for which there is no fee or postage required. In some embodiments, the payment module 150 may communicate to the control hub that the fee or postage for a particular item is to be collected at time of delivery. The control hub 110 may store this information for subsequent transmission to the handheld device along with the route information corresponding to the location or identity of the resource.

The sorter 160 is in communication with the control hub 110. In some embodiments, the control hub 110 and the sorter 160 may be co-located, such that labels generated by printer 116 of the control hub 110 may be affixed to items at the sorter 160, or prior to sorting by the sorter 160. In some embodiments, the sorter 160 may be configured to receive the item information, including the unique identifier and route sequence number from the control hub 110, and print a label at printer 165 located on the sorter 160.

In some embodiments of system 100, following completion of a pick-up route, a resource may provide the items to the sorter 160. In some embodiments, the sorter 160 is configured to receive the route information and the route sequence number, and sort the items according to the route sequence number, which was generated by the dynamic router 130. The sorter 160 may be configured automatically to attach labels containing the unique identifier for each item, and sort the items according to route sequence number.

Figure 2:
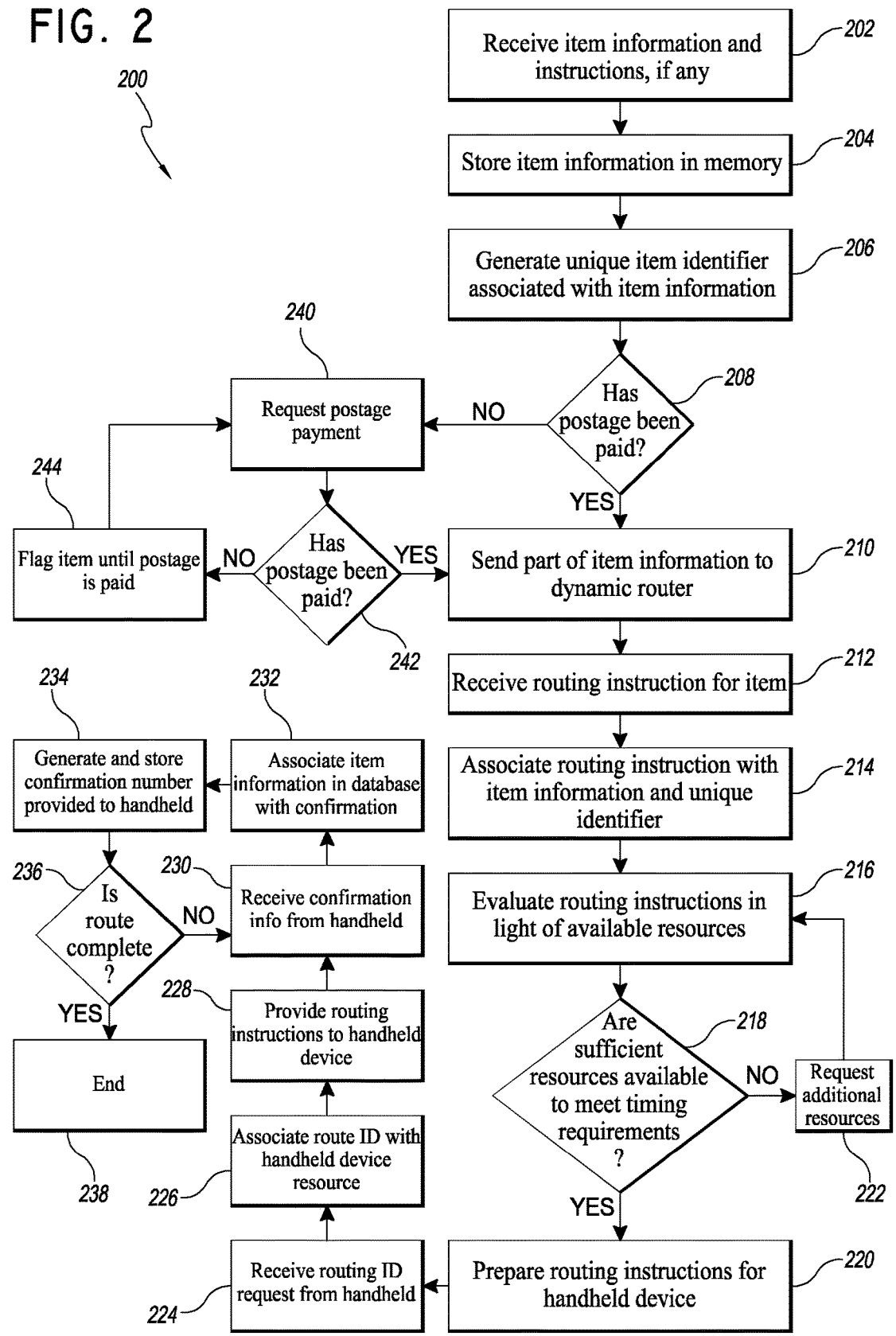
FIG. 2 is a flow chart illustrating a method of coordinating pick-up and delivery of an item via a control hub.

FIG. 2 illustrates an example of an embodiment of a process of operating system 100 for a pick-up and/or a delivery. The process 200 begins at block 202 where an item order and/or item pick-up and delivery information is received at the control hub 110, via the user interface 120. The item order may constitute item information as described elsewhere herein, and may include pick-up and delivery locations or addresses, specific pick-up and/or delivery instructions, time requirements, if applicable, item characteristics, such as size, weight, cost, and any other desired information.

The process 200 next proceeds to block 204, where the control hub 110 stores the item information received in block 202 in a storage medium such as a memory. After storing the item information received in block 202, the process moves to block 206, wherein the control hub 110 generates a unique item identifier, and associates the unique identifier with the item information received in block 202. The unique identifier may comprise one of many identifiers described herein. In some embodiments, the unique identifier comprises a computer-readable barcode.

The process 200 then proceeds to a decision state 208, and the control hub queries the payment module 150 to determine whether payment of a fee or postage has been provided for the item. The payment module 150 communicates to the control hub 110 whether fee or postage has been paid. If the postage has not been paid, process 200 moves to block 240, wherein the control hub 100 requests postage payment, or notifies a user or customer of the need to provide a fee or postage payment. The process 200 moves to decision state 242, wherein it is determined whether postage has been paid in response to the request in block 240. If postage has not been paid yet, the process 200 moves to block 244, and the control hub 110 flags the item information in the database until postage has been paid. After flagging the item information in block 244, the process 200 next returns to block 240. In some embodiments, if after a specified amount of time has passed and no payment has been made, control hub 110 removes the item information from the memory 115, and provides a notification that the pick-up and/or delivery of an item has been cancelled.

If it is determined in decision state 208 that postage has been paid, the process 200 moves to block 210. In block 210, the control hub 110 determines which of the item information is necessary to send to the dynamic router 130, and sends at least part of the item information to dynamic routing. For example, the item information may comprise specific delivery instructions, such as instructions to only deliver the item to a certain party at an address or whether to leave the item at the door if no one answers. The item information may also include the cost of the item, or other item specific information that is not factored into the routing program. The control hub 110 need not transmit the part of the item information which is unnecessary to consider while the dynamic router 130 is optimizing pick-up and delivery routes. For example, the control hub 110 can send address or location information, time requirements, etc., but need not send the identity of the sender or recipient, item-specific instructions, and the like.

In some embodiments, in addition to the pick-up and delivery address or location, the item information may comprise item size, weight or fragility, and pick-up and/or delivery timing. This item information may be useful for the dynamic router 130, as the dynamic router 130 allocates items to specific routes based on resource availability, such as whether the pick-up and/or delivery vehicle has sufficient room to store an item, or whether the resource can complete the pick-up and/or delivery of the item within the specified time constraints.

In some embodiments, the control hub 110 transmits availability of resources to the dynamic router 130. This may include the location and identity of delivery vehicles and carriers, including the capabilities of the delivery vehicles, such as size, maximum weight, speed, and any other desired capability.

Once the dynamic router receives the input from the control hub 110 in block 210, and based on the input received, the dynamic router 130 generates routing instructions and a route sequence number. From block 210 the process moves to block 212, wherein the control hub 110 receives the routing instructions for the item, and receives the route sequence number. The routing instructions for the item may comprise the order in which to deliver the item, if more than one item is assigned to a particular route. The routing instructions may also comprise an optimized route for the resource to follow to complete pick-up and/or delivery of the item. As described above, the route sequence number corresponds to the route into which the item is grouped, where there are other items to be picked-up and/or delivered and have been grouped as a single route. In some embodiments, each item along a given route is assigned the same route sequence number, which allows for efficient sorting of items according to the various routes generated by the dynamic router 130.

Upon receiving the routing instructions and the route sequence number, the process 200 moves to block 214, wherein the control hub 110 associates the routing instructions and the route sequence number with the item information for the item stored in memory 115. The routing instructions and route sequence number are associated by the control hub 110 in order to link the item information and the routing instructions, so that all the relevant item information, including that which was not sent to the dynamic router 130, can be provided to the handheld device 140. By providing all the item information along with the routing instructions to the handheld device 140, a resource may have access to the necessary information regarding specific pick-up and/or delivery instructions, or any other information which may be useful to the resource picking-up or delivering the item.

The process then moves to block 216, wherein the control hub 110 evaluates the route instructions in light of the available resources and any pick-up or delivery constraints which may be affected by the availability of resources. In some embodiments, the availability of resources is taken into account in the dynamic router 130. In some embodiments, the process of block 216 may be initially performed by the control hub 110, or may be performed as a back-up, if the dynamic router 130 has previously considered the availability of resources. Resource availability may change throughout the day, or at some time after the dynamic router 130 has generated routing instructions. Thus, the control hub 110 is configured to re-evaluate the routing instructions in light of the change in resource availability.

After evaluating the route instructions, the process 200 moves to decision state 218, wherein it is determined whether sufficient resources are available to meet the pick-up and delivery requirements. For example, in some embodiments, it is desirable to complete the pick-up and delivery of a plurality of items within the same day. If there are insufficient resources to meet same-day delivery requirements, the control hub 110 may request additional resources, or may automatically allocate additional resources by communicating with a central server which monitors all the resources for a geographic region, including those assigned to routes, tasks, or activities not included in the system 100. If there are insufficient resources available to meet pick-up and/or delivery requirements, the process 200 moves to block 222, wherein the control hub 110 provides a notification of insufficient resources, or requests that additional resources be allocated to system 100.

Upon request for additional resources, the control hub 110 may acquire additional resources, allocated automatically or by action of an agent or supervisor. The control hub 110 may notify the additional resources via a communication as described elsewhere herein. Upon requesting additional resources, the process 200 next moves to block 216, wherein any additionally allocated resources are included as the route instructions are evaluated in block 216. In some embodiments, if additional resources are requested but none is available, the process 200 may continue through the decision state 218, without being continuously looped through block 222. In this circumstance, the control hub 110 may send a communication to users, recipients, vendors, merchants, retailers, or purchasing parties who have either ordered items or who are expecting pick-up and/or delivery of an item at a certain time. The communication may indicate that the timing of pick-up and/or delivery has been changed, or offering additional delivery options, such as a modified pick-up and/or delivery schedule, reduced fees, refunds, or any other desired alternative.

If it is determined in decision state 218 that sufficient resources are available to meet the pick-up and/or delivery requirements, process 200 proceeds to block 220, wherein the control hub 110 prepares route instructions for transmission to one or more handheld devices 140. Preparing route instructions for transmitting may comprise associating the routing instructions and route sequence number with a particular resource, or with a particular handheld device 140. In some embodiments, preparing route instructions may comprise preparing a data packet containing the item information for the item, the routing instructions, and the route sequence number for transmission to the handheld device 140 which requests a particular route, or is assigned to a resource in a particular geographic location.

The process 200 then moves to block 224, wherein the control hub 140 receives a route request from a handheld device 140. Upon receiving the route request from the handheld device 140, the process moves to block 226, wherein the control hub 110 associates the route request received in block 224 with a particular route sequence number, and the associated item information and routing instructions. In some embodiments, the association of route request and route sequence number may be based on the physical location of the handheld device 140 as determined by the GPS unit. For example, if the item to be picked-up or delivered is physically located nearer to one handheld device 140 than another, the route sequence number associated with the item is associated with the route request from the nearer handheld device 140.

In some embodiments, the association of the route request with the route sequence number may be based on the identity of the resource as transmitted through handheld device 140. For example, a particular resource may be assigned to a particular geographic portion of an area, such as a city. As the particular resource is available and requests a route sequence number, a route sequence number associated with routing instructions which are within the assigned geographic area is associated with the route request. In some embodiments, the route sequence number is associated with the route request based on a random assignment. For example, in some embodiments, the resources may all be centrally located at the beginning of the day, and may all be randomly assigned a route sequence number.

After associating a route request with a route sequence number as depicted in block 226, the process 200 next moves to block 228 wherein the control hub 110 provides the route sequence number associated in block 226, the accompanying routing instructions, and item information for the items to the handheld device 140. Upon providing the above information to the handheld device 140, a resource commences pick-up or delivery of the item according to the route sequence number and routing instructions provided in block 228.

In some embodiments, the resource, upon arriving at a pick-up location, may input, via the input device 144 a confirmation of pick-up of the item. The confirmation may comprise checking a box or tapping a "pick-up complete" icon on the display 142 of the handheld device 140. In some embodiments, the resource may have acquired labels corresponding to the items to be picked up from the central hub prior to picking up the item. In this case, the resource may affix the appropriate label to the item being picked up. To confirm pick up of this item, the resource may scan the label using scanner 146 of handheld device 140. The input or scanned pick-up confirmation is transmitted to the control hub 110, where it is received in block 230.

In some embodiments, confirmation of the delivery of the item, may be generated and provided in the manner described in relation to item pick-up. For example, when an item is delivered, the label is scanned using scanner 146, and the handheld device automatically generates and transmits a delivery confirmation to the control hub 110. In some embodiments, upon scanning an item with scanner 146, the display 142 may request an identification of a pick-up or delivery action associated with the item which was scanned. The resource may select or indicate which action has occurred, and the confirmation will be generated and transmitted to the control hub 110. For example, in some embodiments, when an item label is scanned upon delivery, the display 142 provides a menu of actions, such as pick-up, delivery, failed pick-up, failed delivery, or other options. In the case where delivery is successful, the resource selects "delivery," and the delivery confirmation is generated and sent to the control hub 110 by the handheld device 140.

In some embodiments, the handheld device 140 is configured to accept a payment from a sender, recipient, or other party. The handheld device 140 can be configured with a magnetic stripe reader, a near field communication module, or other feature to accept a payment. The handheld device 140 can communicate with the payment module 150 via the control hub 110, and access a third party payment system such as PayPal®, Google Wallet®, Apple Passbook®, or other similar internet-based payment systems.

For example, regarding an item, the control hub 110 may receive a notification from the payment module 150 that an item is indicated for payment upon pick-up or delivery. The control hub 110 can communicate this information to the handheld device 140. When a resource with the handheld device 140 arrives at a location for either pick-up or delivery of an item, the handheld device 140 displays an indicator or information to the resource to collect payment. The handheld device 140 can be activated to accept a payment via a near field communication system, a magnetic strip reader, such as a "Square" brand credit card reader, or a third party system such as PayPal and the like. The sender or the recipient of the item provides a payment using the handheld device 140. The handheld device 140 communicates the payment to the payment module 150, which can be done via the control hub 110, and the payment module 150 receives the payment information, stores information regarding the payment, and, in some embodiments, provides an authorization to the handheld device 140 that the resource is authorized to pick-up or deliver the package. Upon receiving the authorization, the handheld device 140 may display pick-up or delivery confirmation options, which, prior to receiving the authorization, may not have been an option selectable or available on the handheld device 140.

Upon receiving pick-up or delivery confirmation from the handheld device 140 in block 230, the process 200 proceeds to block 232, where the pick-up or delivery confirmation is associated with the item information stored in the memory 115. Next, as shown in block 234, the control hub 110 generates a confirmation number associated with the item information, stores the confirmation number, and in some embodiments, provides the confirmation number to the handheld device 140.

After generating and storing the confirmation number in step 234, the process 200 proceeds to decision state 236, wherein it is determined whether the route is complete. The control hub 110 queries the memory 115 to determine whether a pick-up or delivery confirmation for all the items assigned or grouped to a particular route sequence number have been received, or whether a notice from the handheld device 140 that an item is unable to be picked-up and/or delivered has been received for each item. If all the items of the route have not yet been picked-up and/or delivered, the process returns to block 230 to await confirmation of pick-up and delivery of another item. If all the items of the route have been picked-up and/or delivered, or indicated as pick-up or delivery not possible, then process 200 ends at block 238.

In some embodiments, steps 224 through 238 of process 200 are performed and/or repeated for every item of each route or for each item associated with a route sequence number. In some embodiments, these steps may coordinated by control hub 110 performance of these steps, as multiple resources complete pick-ups and/or deliveries throughout a geographic area. Although the foregoing description referred mainly to the process for one item, it will be understood that the process 200 may be performed for multiple items. For example, in some embodiments, the control hub 110 receives item information from a customer, vendor, merchant, retailer, or purchasing party for a plurality of items in block 202. The process proceeds as described above, storing and associating item information for each of the plurality of items individually. The plurality of items are divided into routes according to their relative pick-up and delivery locations, in light of any special instructions, and each route, comprising the routing instructions for one or more of the plurality of items, is assigned a route sequence number by the dynamic router 130.

Figure 3:
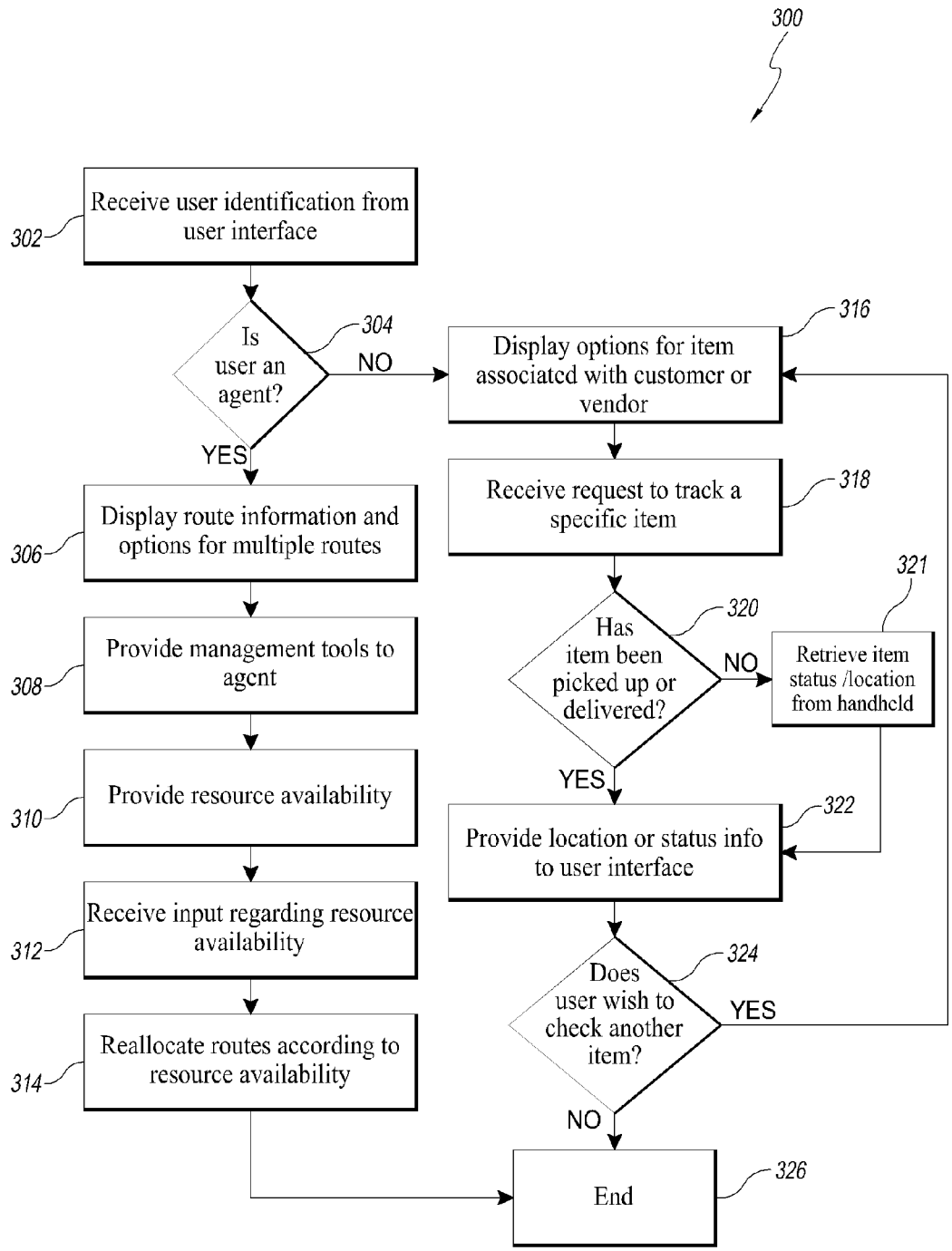
FIG. 3 is a flow chart illustrating a method of interfacing with a control hub via a user interface.

FIG. 3 illustrates a process of interfacing with the control hub 110 via the user interface 120. Process 300 begins by receiving user identification at the user interface 120. In some embodiments, in order to access information via the user interface, the user must be positively identified as an authorized user, which is done by comparing the received identification to a database of authorized users stored in a user identification database on the control hub 110.

As described above, the user information may be generated at the time of purchase of an item or upon registering for access to the user interface 120. In some embodiments, the user may be a resource, an agent, or a supervisor. The identification information of the resource, agent, or supervisor may be added to the user identification database as part of an employment process, and the authorized access may change as the user or supervisor's responsibilities change. From block 302, the process moves to decision state 304, wherein the user interface 120 queries the user identification database to ascertain whether the user identification input received in block 302 corresponds to an authorized user of the user interface 120.

If the user is registered as an agent or supervisor, the user interface 120 allows agent or supervisor access, as depicted in block 306. The agent or supervisor access may comprise the ability to access the tracking data for resources corresponding to a particular geographic area, such as a city or neighborhood within a city, and allows the agent or supervisor to track the movements of multiple resources, and to communicate with the multiple resources. The access level described here is exemplary only. Agent or supervisor access to the user interface 120 may allow the agent or supervisor access to other data associated with the pick-up and/or delivery of items, such as the payment of postage or fees, the value of packages, the timing of deliveries, metrics regarding resource performance, and any other desired information.

Block 306 represents a particular access available to a supervisor or agent. In block 306, the user interface 120 displays route information and resource and routing options, such as alternate routes, unforeseen routing problems, and the like. In block 308, the agent or supervisor receives access to management tools, such as the ability to communicate with resources, to reroute pick-ups and/or deliveries, to change and communicate changes in pick-up and/or delivery priorities, and other desired abilities.

In some embodiments, the user may request resource availability. In block 308, the control hub 110 may provide the agent or supervisor is provided with resource availability, or a list of resources and their currently assigned tasks. In some embodiments, the agent or supervisor may provide the resource availability to the control hub 110. After the control hub 110 provides resource availability to the supervisor or agent, the process 300 moves to block 312, wherein the user interface 120 receives input from the supervisor or agent regarding resource availability, and which resources should be allocated for a particular route or assignment. For example, in some embodiments, a particular geographic area may have a resource which is on schedule to finish pick-ups and deliveries earlier than expected. In this case, the agent or supervisor may, via the user interface 120, provide updated routing instructions via the control hub 110 to the individual resource who finishes early, and instruct this resource to proceed to additional pick-up points or to make additional deliveries.

In another example, while resources are delivering items, a new item or item information may be received into the system 100 which is indicated for delivery on the same day. The control hub 110 receives the item information from the sorter 160 or from input via a user interface 120. The control hub 110 is configured to recognize the item identification and identify that the item should be picked up and/or delivered within a certain time frame, such as the same day. The control hub 110 can evaluate the current routes of the resources and determines which resource's assigned route will pass nearest the pick-up location. The control hub 110 may send the item information to the dynamic router 130 with instructions to add the new item into the route. In some embodiments, the control hub can send an instruction to the handheld device 140 assigned to the resource whose route passes nearest the pick-up location, instructing the resource to pick-up the package. The control hub 110 may send updated turn-by-turn navigation instructions received from the dynamic router 130 to the handheld device 140. The control hub 110 may instruct the resource, via the handheld device 140, to pick up the item and return the item to a central distribution area, or to deliver the item. The control hub 110 may evaluate the routes of multiple resources and send instructions to the handheld devices 140 of two resources, instructing them to physically meet and exchange the newly picked up item, such that the resource which did not pick up the item will receive and deliver the item.

In some embodiments, a new resource may become available which was not available at the time of route allocation to the resources. The agent or supervisor may input the availability of the new resource via user interface 120, and the user interface may provide the input to the control hub 110, as shown in block 312. The control hub then can resend the item information and updated resource availability of items which have not yet been picked-up and/or delivered to the dynamic router 130. For example, a resource may have routing instructions which take the resource near a pick-up location for an item which has not yet been picked up and/or was assigned to another resource. The control hub 110 can then receive and send instructions to update the routing instructions for the resource, and to transmit new routing instructions, along with a message, to the handheld device 140 assigned to a resource passing near the pick-up location.

In some embodiments, the update of routing instructions based on proximity to pick-up locations may occur within the control hub 110, automatically, without instruction from an agent or supervisor. For example, the control hub 110 may automatically allocate or reallocate the available resources based on item pick-up and/or delivery location or timing, proximity of resources to pick-up and/or delivery locations, or any other desired basis, effectively combining the steps of blocks 310 and 312.

As depicted in block 314, routes are reallocated according to the resource availability input that was received in block 312. For example, in some embodiments, the dynamic router 130 may provide updated routing instructions and route sequence numbers. In some embodiments, the control hub 110 may receive the new routing instructions, and may transmit the new routing instructions to one or more of the handheld devices 140, updating the routing instructions and item information for each individual route. In some embodiments, the route instructions will only be updated for items that have not yet been picked up and/or delivered. The updated routing instructions may take into account the location of each item, for example, if an item is already in the possession of a resource for delivery, the resource assigned to deliver that item may not change, although the delivery order or particular routing instructions may change.

Referring back to decision state 304, if the user is not identified as an agent or supervisor, the agent may be identified as a customer, such as a vendor, merchant, retailer, purchaser, sender, or recipient of an item. In this case, the process 300 proceeds to block 316, wherein the user interface 120 provides a level of access different from the access provided to an agent or supervisor, such as customer access. In block 316, the user interface 120 provides options associated with a vendor or customer, such as the ability to track the pick-up and/or delivery status, or the real-time location of a particular item or items associated with the vendor or customer.

The process moves to block 318, as the user interface receives a request to track a specific item associated with the user identification received in block 302. Upon receiving the request to track a specific item, the process moves to decision state 320. In decision state 320, the user interface 120 queries the control hub 110 for the status of the item. If, for example, the item has been picked-up or delivered, a record of this action is already stored in a memory accessible by the control hub 110 associated with the item identifier, and the control hub 110 provides this information to the user where it is then displayed on the user interface 120 as depicted in block 322. This information may be displayed on the user interface, or may be sent to a user's mobile computing device, such as via email or SMS text. A customer may request that the control hub 110 send a status update via email or SMS text whenever the item is scanned, such as at pick-up or delivery. When the control hub 110 receives a status update from the handheld receiver 140, such as by scan, the control hub 110 identifies that the customer requested notification, and the control hub 110 sends a notification to the requesting customer.

If, the item has not yet been picked-up and/or delivered, the process 300 moves to block 321, wherein the control hub 110 queries the handheld device 140 with which the routing instruction and route sequence number for the specific item are associated. The handheld device 140 may provide the real-time location, using GPS location technology, to report to the control hub 110 the location of the handheld device, and thus the resource which is scheduled or assigned either to pick-up or to deliver the item. As described above, the control hub 110 may also provide more detailed routing information including the number of pick-ups and/or deliveries preceding the specific item, or the estimated time of delivery, based on the GPS location, the route sequence number of the item, and the order of delivery of the specific item. This information is sent to the user interface 120, and is displayed, also as depicted in block 322. This information may be sent to the user as an email, SMS text, or in any other desired format.

The process 300 then moves to decision state 324, wherein it is determined whether a user or customer wishes to track another item. If the status of another item is desired, the process 300 returns to step 316, and steps 316 through 324 are repeated. If it is determined in decision state 324 that the status of another item is not requested from block 316, the process ends at block 326.

Figure 4:
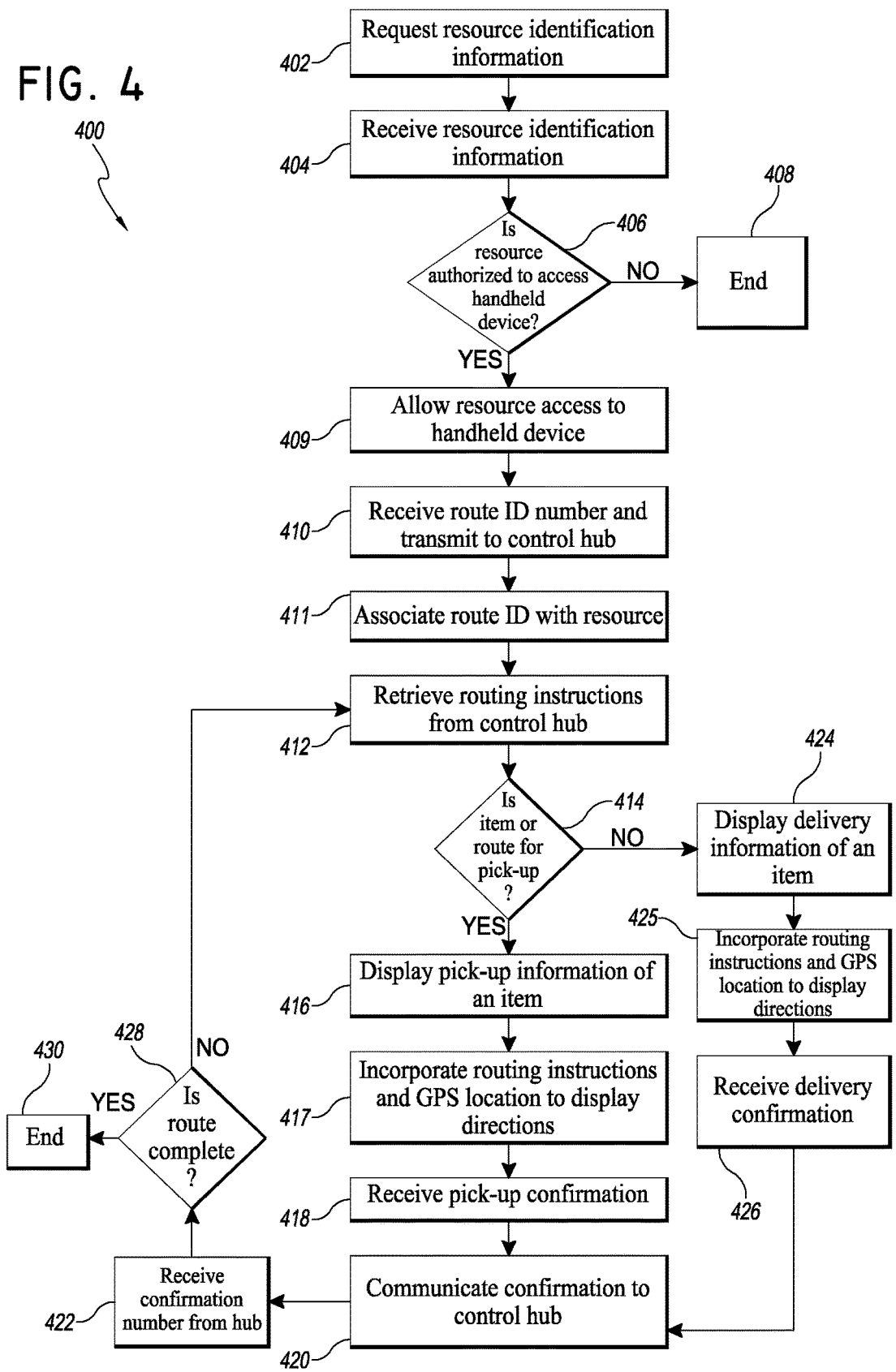
FIG. 4 is a flow chart illustrating a method of providing routing instructions to a resource.

FIG. 4 depicts a flow chart of a process of providing routing instructions to a resource on a handheld device 140. Process 400 begins in block 402 wherein the handheld device 140 requests user identification from the resource. In some embodiments, the user of the handheld device 140 is a resource, such as a carrier, delivery vehicle driver, or the like. Each resource is generally provided a unique identification. The process 400 then moves to block 404, wherein the handheld device 140 receives the resource identification requested in block 402. The identification may be input into handheld device 140 by using the input device 144, or it may be received into handheld device 140 by using the scanner 146 to scan an identifier, such as, for example, a barcode, a magnetic stripe, or other computer readable code located on an employee identification badge.

In order to use the handheld device 140, the resource must be positively identified as an authorized resource, which is done by comparing the received resource identification to a database of authorized resources stored in a resource identification database on the control hub 110. From block 404, the process moves to block 406, wherein it is determined whether the resource identification identifies an authorized agent. To do this, the handheld device may query the resource identification database to ascertain whether the resource identification input received in block 404 corresponds to an authorized resource for using the handheld device 140, stored in the resource identification database.

From block 404, the process moves to decision state 406, wherein it is determined if the resource is positively identified as an authorized resource. If the resource is not positively identified as an authorized resource, for example, if the resource identification information is not contained in the resource identification database, the process 400 moves to block 408, where it terminates, and access to the handheld device 140 is not allowed. If it is determined in decision state 406 that the resource is positively identified, for example, if the resource identification information is contained in the resource identification database, the process moves to block 409, wherein the handheld device 140 is activated allowing the resource to access the handheld device 140. The process 400 then moves to block 410. In some embodiments, the resource has the option to input a route identification number. The route identification number is received in the handheld device 140 and transmitted to the control hub 110 as depicted in block 410 The route identification number may comprise a unique identifier assigned to each resource, which identifies the geographic area, for example, a city, or neighborhood, to which a particular resource is assigned. In some embodiments, the route identification number may correspond to a route sequence number generated by the dynamic router 130. In some embodiments, the route identification number need not be input, but is automatically associated with the agent or resource identification or login information.

The process 400 then proceeds to block 411, wherein the control hub 110 associates the route identification number, or, in some embodiments, with the resource or agent identification information, and assigns a route to the resource or the handheld device 140. As depicted in block 412, the handheld device receives the route, the route sequence number and the associated routing information and item information from the control hub 110.

The process 400 then proceeds to a decision state 414 where it is determined whether the route identified by the route sequence number is a pick-up route or a delivery route. In some embodiments, a route may include both pick-up and delivery of items. In this case, the decision state 414 determines whether the first item is indicated for pick-up or delivery. If the route or item is scheduled for pick-up, the process 400 moves to block 416, and the handheld device 140 displays the route instructions for the item. The route instructions may be displayed as an interactive list, with each item having an entry on the list arranged according to route sequence number. Upon selecting an item on the display, the handheld device 140 can display item information for the selected item. The handheld device 140 may also display the item information associated with the item to be picked up, including any specific pick-up instructions. The process then proceeds to block 417, wherein the handheld device then displays navigation information, such as turn-by-turn directions to the resource, and by incorporating the routing instructions with the GPS location information, the handheld device 140 provides turn-by-turn directions to the resource.

The process 400 then moves to block 418, wherein pick-up confirmation is received. In some embodiments, the pick-up confirmation may be input to the handheld device 140 via the input device 144. In some embodiments, the pick-up confirmation may be received in the handheld device 140 via the scanner 146. The scanner 146 may be used to scan the unique identifier on a label generated by printer 116 at the control hub 110, which the resource brought to the pick-up location. In some embodiments, the customer, vendor, retailer, or merchant may have previously printed the label containing the unique identifier and affixed it to the item to be picked up. In this case, the resource may scan the affixed label using the scanner 146, and confirmation of pick-up is received in the handheld device 140.

Returning to decision state 414, if the route or item is identified as a delivery route or an item to be delivered, the process moves to block 424, wherein the delivery information is displayed on the handheld device 140. The handheld device 140 displays the routing instructions generated by the dynamic router 130 for the item to be delivered. The handheld device may also display the item information associated with the item to be delivered, including any specific delivery instructions. The process then proceeds to block 425, wherein the handheld device displays navigation information to the resource, and by incorporating the routing instructions with the GPS location information, the handheld device 140 provides the resource with turn-by-turn directions.

Upon delivery of the item, the process 400 moves to block 426, wherein the handheld device 140 receives a delivery confirmation. In some embodiments, the delivery confirmation may be input to the handheld device 140 via the input device 144. In some embodiments, the delivery confirmation may be received in the handheld device 140 via the scanner 146. The scanner 146 may be used to scan the unique identifier on a label generated by printer 116 at the control hub 110, which has previously been affixed to the item. In some embodiments, the customer, vendor, retailer, or merchant may have affixed the label containing the unique identifier to the item to be delivered. In this case, the resource may scan the affixed label using the scanner 146, and confirmation of delivery is received in the handheld device 140.

Following either block 418 or 426, wherein pick-up or delivery confirmation is received in the handheld device 140, the process 400 proceeds to block 420, wherein the handheld device 140 communicates the pick-up or delivery confirmation to the control hub 110. The control hub 110 may generate a confirmation number, as described elsewhere herein. In block 422, the handheld device 140 receives the confirmation number from the control hub 110. In some embodiments, the confirmation number may be generated by the handheld device 140, and the confirmation number may be communicated to the control hub 110 together with, or in the place of, the pick-up or delivery confirmation.

In some embodiments, upon generating the pick-up and/or delivery confirmation, the control hub 110 may provide an alert or message to the customer, vendor, merchant, or retailer who requested pick-up and/or delivery, indicating the successful completion of either the pick-up or delivery. In some embodiments, the alert or message may be sent via e-mail, SMS text, instant message, voicemail, or any other desired communication method.

The process 400 next proceeds to decision state 428, wherein it is determined if the route is complete. If there are more items assigned to the route, or for which the handheld device 140 has received routing instructions which have not yet been either picked up and/or delivered, the process 400 returns to block 412 and repeats the process for the next item to be picked up and/or delivered. If there are no items remaining on the route, or if pick-up and/or delivery confirmation has been received for each item assigned on the route which has been assigned a route sequence number, the process 400 ends in block 430.

Although above steps of the above processes have been described a particular order, the steps are not limited to performance in the order indicated. It will be understood by a person of skill in the art, guided by the teachings herein, that the steps of the processes described herein may be performed in one or more orders, as desired. A person of skill in the art will further recognize than the above-outlined steps can be performed in any desired order, and can include sub-steps or sub-processes.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A system for distributing a plurality of items to a plurality of destinations comprising:

a control hub configured to receive item information for each of the plurality of items and to generate a unique identifier for each of the plurality of items, the unique identifier associated with the received item information for the corresponding item of the plurality of items, and the item information comprising a time restriction for pick-up or delivery of one of the plurality of items;

a dynamic routing system in communication with the control hub, wherein the control hub is configured to provide at least part of the item information for at least one of the plurality of items to the dynamic routing system and to receive from the dynamic routing system pick-up routing instructions comprising a pick-up route identification, and a pick-up route sequence number for the at least one of the plurality of items in the identified pick-up route, and to receive delivery routing instructions comprising a delivery route identification, and a delivery route sequence number for the at least one of the plurality of items in the identified delivery route, wherein at least two of the plurality of items are to be picked up from different merchants at different merchant locations;

a sorting device in communication with the control hub, the sorting device being configured to receive the associated item information, delivery routing instructions, and delivery route sequence number for the at least one of the plurality of items from the control hub, and is configured to sort the at least one of the plurality of items according to the received associated item information, routing instructions and delivery route sequence number, and to automatically place information including the unique identifier for the at least one of the plurality of items onto said at least one item;

a device in wireless communication with the control hub, wherein the control hub wirelessly communicates routing instructions to the device; and a user interface in communication with the control hub, the user interface configured to send information and queries to and receive information and queries from the control hub, the information and queries related to delivery, pick-up, and tracking of a delivery status of the at least one of the plurality of items, wherein the control hub is configured to associate information and queries received from the device with the stored item information for the corresponding at least one of the plurality of items; and wherein, while a first resource is on a route assigned to that resource, the control hub is configured to:

evaluate whether the first resource will be able to meet the time restrictions on pick-up or delivery of the one of the plurality of items;

cause an additional resource to travel a changed assigned route to accomplish pick-up or delivery of the one of the plurality of items if the first resource will not be able to meet the time restrictions; and cause the first resource to travel a modified pick-up and delivery route so that the first resource completes pick-up and delivery of others of the plurality of items in response to the changed assigned route of the additional resource.

2. The system of claim 1 further comprising a payment system in communication with the control hub, the payment system configured to provide payment information regarding at least one of the plurality of items.

3. The system of claim 1, wherein the item information comprises at least one of a pick-up location, delivery location, vendor name, recipient name, item dimensions, and delivery instructions.

4. The system of claim 1, wherein the routing instructions provide a route optimized to minimize the time required for the pick-up and delivery of the plurality of items.

5. The system of claim 1 wherein, the control hub is configured to receive the routing instructions and the route sequence number for the plurality of items, and wherein the control hub associates the item information of each of the plurality of items with the routing instructions and route sequence number for the corresponding item of the plurality of items.

6. The system of claim 5, wherein the control hub is further configured to associate the routing instructions and the route sequence number for each of the plurality of items with the unique identifier for the corresponding item of the plurality of items.

7. The system of claim 1, wherein the control hub is configured to receive payment information from a payment system, and is configured to associate a payment status with one or more of the plurality of items.

8. The system of claim 1, wherein the user interface is accessible via a network remote from the control hub.

9. The system of claim 1, wherein the control hub is configured to query the device regarding the delivery status of one of the plurality of items and is further configured to provide the query results to the user interface.

10. The system of claim 9, wherein the delivery status comprises at least one of pick-up confirmation, delivery confirmation, or item location.

11. The system of claim 1, wherein the routing instructions received from the control hub comprise a pick-up schedule, a delivery schedule, pick-up route, and delivery route, for at least one of the plurality of items and wherein the device is configured to provide directions for the pick-up route and delivery route using a global positioning system.

12. The system of claim 6, wherein the control hub is configured to associate the item information, routing instructions, and route sequence number to the sorting device and the device such that each of the plurality of items is scheduled for pick-up and delivery on the same day.

13. A method of delivering a plurality of items to a plurality of destinations comprising:

receiving, via a control hub, item information for each of the plurality of items, wherein the item information comprises a time restriction for pick up or delivery of one of the plurality of items;

storing the item information for each of the plurality of items in a database accessible by the control hub;

generating a unique identifier for each of the plurality of items, the unique identifier being associated with the stored item information for the corresponding item of the plurality of items;

providing at least a portion of the stored item information for at least one of the plurality of items to a dynamic routing system;

generating routing instructions and a route sequence number in the dynamic routing system, the routing instructions comprising pick-up and delivery route identification associated with the at least one of the plurality of items and the route sequence number comprising a sequence number for the at least one of the plurality of items in the identified route, and wherein at least two of the plurality of items are to be picked up from different merchants at different merchant locations;

sorting, in a sorting device, the at least one of the plurality of items according to the associated item information routing instructions and the route sequence number;

automatically placing, by the sorting device, information including the unique identifier for the at least one item of the plurality of items onto said at least one item;

receiving the routing instructions in the control hub and wirelessly communicating the routing instructions to a plurality of handheld devices, wherein the handheld devices display route information for each of the plurality of items;

while a first resource is on a route assigned to that resource, evaluating whether the first resource will be able to meet the time restriction for pick-up or delivery of the one of the plurality of items;

causing an additional resource to travel a changed assigned route to accomplish pick-up or delivery of the one of the plurality of items if the first resource will not be able to meet the time restriction;

causing the first resource to travel a modified route so that the first resource completes pick-up or delivery of others of the plurality of items, in response to the changed assigned route of the additional resource;

receiving pick-up and delivery status for at least some of the plurality of items from one of the handheld devices;

providing pick-up and delivery status information received from said one of the handheld devices for at least one of the plurality of items to a user interface;

associating the pick-up and delivery status information for at least some of the plurality of items with the item information stored in the database; and providing real-time pick-up and delivery information for at least one of the plurality of items to the control hub.

14. The method of claim 13, wherein the item information comprises at least one of pick-up location, delivery location, vendor name, recipient name, item dimension, or delivery instructions.

15. The method of claim 14, wherein the control hub receives the routing instructions and the route sequence number from the dynamic routing system, and associates the item information of each of the plurality of items with the routing instructions and the route sequence number for the corresponding item of the plurality of items.

16. The method of claim 15, further comprising associating the routing instructions and the route sequence number for each of the plurality of items with the unique identifier for the corresponding item of the plurality of items in the control hub.

17. The method of claim 13 further comprising receiving a payment status for one or more of the plurality of items and associating the payment status with the one or more of the plurality of items.

18. The method of claim 13, wherein the user interface is accessible remote from the control hub.

19. The method of claim 13, wherein receiving pick-up and delivery status from the handheld device comprises querying the handheld device in response to an input received via the user interface, and providing the pick-up and delivery status from the handheld device to the user interface via the control hub in response to the query.

20. The method of claim 13, wherein the handheld device provides directions for an optimal pick-up route and delivery route for each of the plurality of items, using a global positioning system.

21. The method of claim 15 wherein associating the item information of each of the plurality of items with the routing instructions and the route sequence number for the corresponding item of the plurality of items comprises:

generating pick-up and delivery schedules such that each of the plurality of items is picked up and delivered on the same day; and transmitting the pick-up and delivery schedules to the plurality of handheld devices.

* * * * *